United States Patent

[11] 3,607,902

| [72] | Inventors | Pierre Brison<br>Oullins;<br>Marcel Lefort, Caluire, both of France |
|---|---|---|
| [21] | Appl. No. | 872,369 |
| [22] | Filed | Oct. 29, 1969 |
| [45] | Patented | Sept. 21, 1971 |
| [73] | Assignee | Rhone-Povlenc S. A.<br>Paris, France |
| [32] | Priority | Oct. 31, 1968 |
| [33] | | France |
| [31] | | 172,172 |

[54] NEW SILICON DERIVATIVES OF ALLYL ALCOHOL
10 Claims, No Drawings

[52] U.S. Cl. .................................................. 260/448.8 R,
161/93, 161/185, 161/193, 161/207, 161/209,
161/213, 161/DIG. 4
[51] Int. Cl. ...................................................... C07f 7/18
[50] Field of Search ........................................ 260/448.8 R

[56] References Cited
UNITED STATES PATENTS

| 2,970,150 | 1/1961 | Bailey | 260/448.8 R X |
| 3,299,173 | 1/1967 | Roselli | 260/448.8 R X |
| 3,450,737 | 6/1969 | Colleuille | 260/448.8 R |
| 3,472,888 | 10/1969 | Bazouin et al. | 260/448.8 R |
| 3,529,007 | 9/1970 | Brison et al. | 260/448.8 R |

*Primary Examiner*—Tobias E. Levow
*Assistant Examiner*—P. F. Shaver
*Attorney*—Stevens, Davis, Miller & Mosher ABSTRACT: New organosilicon compounds based on allyl alcohol, which are 1-triorganooxysilyl-prop-1-en-3-ols or their 3-triorganosiloxy derivatives are useful as finishing agents for woven glass fabric/epoxy resin laminates or for adhesion undercoats in the glueing of organosilicon elastomers to metal or wooden supports.

NEW SILICON DERIVATIVES OF ALLYL ALCOHOL

This invention relates to silicon derivatives of allyl alcohol and to processes for their preparation.

B. A. Sokolov and A.M. Grishko have described 1-trialkyl-silyl-prop-1-en-3-ols and 1-trialkyl-silyl-3-trialkylsiloxy-prop-1-enes but no industrial application has been suggested for these compounds.

The present invention provides new organosilicon compounds of the formula:

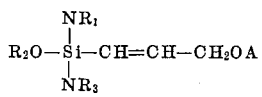

$$R_2O-\underset{\underset{NR_3}{|}}{\overset{\overset{NR_1}{|}}{Si}}-CH=CH-CH_2OA$$

wherein $R_1$, $R_2$ and $R_3$ may be the same or different and each represents an unsubstituted or alkoxy-, cycloalkoxy-, aryloxy-, aralkoxy- or alkylaryloxy-substituted alkyl, cycloalkyl, aryl, aralkyl or alkylaryl radical and optionally two of the radicals $R_1$, $R_2$ and $R_3$ are joined to form a single divalent radical which with the Si atom forms a dioxasilane ring; and A represents a hydrogen atom or a radical of the formula:

$$-\underset{\underset{R_6}{|}}{\overset{\overset{R_4}{|}}{Si}}-R_5$$

wherein $R_4$, $R_5$ and $R_6$ may be the same or different and each represents an alkyl, aryl or aralkyl radical.

Preferably the alkyl radicals or the alkyl portions of the radicals $R_{1-6}$ contain 1 to 6 carbon atoms, the aryl radicals or aryl portions of the radicals $R_{1-6}$ are phenyl groups and the cycloalkyl radicals or the cycloalkyl portions of the radicals $R_{1-3}$ contain 5 or 6 carbon atoms.

The compounds of formula (I) in which A represents a radical of the formula $-SiR_4R_5R_6$ may be prepared by reacting a hydrosilane of the formula:

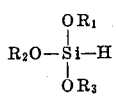

$$R_2O-\underset{\underset{OR_3}{|}}{\overset{\overset{OR_1}{|}}{Si}}-H$$

wherein $R_1$, $R_2$ and $R_3$ are as hereinbefore defined, with a 3-triorgano-siloxy-prop-1yne of the formula:

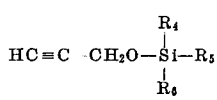

$$HC\equiv C-CH_2O-\underset{\underset{R_6}{|}}{\overset{\overset{R_4}{|}}{Si}}-R_5$$

wherein $R_4$, $R_5$ and $R_6$ are as hereinbefore defined, in accordance with the equation:

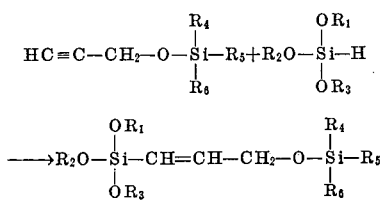

$$HC\equiv C-CH_2-O-\underset{\underset{R_6}{|}}{\overset{\overset{R_4}{|}}{Si}}-R_5+R_2O-\underset{\underset{OR_3}{|}}{\overset{\overset{OR_1}{|}}{Si}}-H$$

$$\longrightarrow R_2O-\underset{\underset{OR_3}{|}}{\overset{\overset{OR_1}{|}}{Si}}-CH=CH-CH_2-O-\underset{\underset{R_6}{|}}{\overset{\overset{R_4}{|}}{Si}}-R_5$$

This reaction can be catalysed by an initiator such as ultraviolet radiation, or a compound based on nickel or platinum. The catalyst is preferably chloroplatinic acid used in amounts of 0.01 g. to 0.1 g. per mol of compound

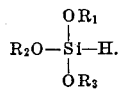

$$R_2O-\underset{\underset{OR_3}{|}}{\overset{\overset{OR_1}{|}}{Si}}-H.$$

The reaction temperature is generally 60° to 150° C and preferably 70° to 100° C. The process can be carried out in organic solvents which are inert to the reagents. such as chlorinated or nonchlorinated aliphatic or aromatic hydrocarbons, nitriles or ethers. Such solvents include benzene. cumene, cyclohexane, O-dichlorobenzene, diethyl ether and acetonitrile.

The reactants are generally used in essentially stoichiometric proportions. However an excess of acetylenic compound can be used without difficulty, but it is preferable not to use an excess of the hydrosilane because this excess may condense with the desired ethylenic product. In practice, the reaction is carried out by gradually adding the hydrosilane to a mixture comprising the catalyst and the 3-triorganosiloxy-prop-1-yne at the desired temperature.

The reaction product generally comprises a mixture of two stereoisomers in which the positions of the silicon-containing groups relative to the double bond are different The purification of the reaction product, and, where appropriate its separation into its two isomers, may be carried out by any appropriate means, for example by distillation when the molecules are of not too high a molecular weight The 3-triorganosiloxy-prop-1-yne starting material can be obtained by reaction of a triorganochlorosilane with propargyl alcohol in the presence or absence of hydrochloric acid acceptor The compounds of formula (I) in which A represents a hydrogen atom may be prepared by reacting a compound of formula (I) in which A represents a radical of the formula

$$-\underset{\underset{R_6}{|}}{\overset{\overset{R_4}{|}}{Si}}-R_5$$

with an alcohol of the formula:

$$R_7OH$$

wherein $R_7$ is an unsubstituted or alkoxy- cycloalkoxy aryloxy-, or alkylaryloxy-substituted alkyl, cycloalkyl aryl aralkyl or alkylaryl radical, in accordance with the equation

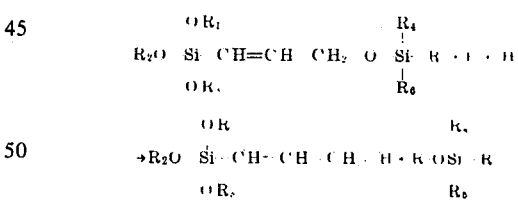

If the radical $R_7$ is different from any of the radicals $R_1$ $R_2$ or $R_3$ partial or total replacement of these radicals by a radical $R_7$ may take place during the reaction, depending on the amount of alcohol $R_7OH$ employed $R_7$ preferably represents an alkyl or alkoxy-alkyl radical When this alcoholysis reaction has been carried out the greater part of the excess alcohol is removed by distillation overheating of the reagents being avoided and then the removal of alcohol is completed by evaporation under reduced pressure at about 20° C These precautions prevent intramolecular cyclisation side-reactions occurring The compounds of the invention can be put to numerous uses. They can for example be used as finishing agents for laminates based on woven glass fabric and epoxy resin By coating the woven glass fabric with the compounds of this invention, laminates are obtained which display good mechanical properties The compounds of the invention may also be used as adhesion undercoats in the glueing of organosilicon elastomers, obtained from a cold-vulcanisable or ganopolysiloxane composition, to metal or wooden supports The following Examples illustrate the invention

EXAMPLE 1

82 g. of triethoxysilane (0.5 mol.) are poured, over the course of 60 minutes, into an 0.25 liter flask containing a mixture of 80 g. of 3-trimethylsiloxy-prop-1-yne (0.6 mol.) and 0.1 g. of chloroplatinic acid which is stirred and maintained at a temperature of 70° C. The reaction mixture is stirred and kept at 70° C. for a further 60 minutes, it is then fractionally distilled under a pressure of 0.4 mm. of mercury and the following fractions obtained:

15.5 g. of volatile fraction, boiling point (0.4 mm./hg.) < 69° C 119 g. of 1-triethoxysilyl-3-trimethylsiloxy-prop-1-ene, boiling point (0.4 mm./hg.) 69° to 76° C.

15 g. of distillation residue.

The 1-triethoxysilyl-3-trimethylsiloxy-prop-1-end thus obtained is a mixture of *cis* and *trans* isomers in the proportion of 75/25 (infrared analysis). This mixture has the following properties:

$n_D^{20} = 1.4171$ $d_4^{20} = 0.926$.

The 3-trimethylsiloxy-prop-1-yne starting material was prepared in the following manner:

First 211 g. of diethyl ether, and then 313.5 g. of triethylamine (3.1 mols.) and finally 168 g. of propargyl alcohol (3 mols.) are introduced into a 5 liter flask. The reactants are cooled to 10° C., and 336 g. of trimethylchlorosilane (3.1 mols.) are poured in slowly with stirring, while the temperature is kept at about 10° C. This addition is carried out over a period of 2 hours. The reaction mixture is then allowed to return to a temperature of about 20° C., and stirring is continued for 15 hours at this temperature. The precipitated hydrochloride is then filtered off, washed with 4×250 ml. of anhydrous diethyl ether and then dried under reduced pressure. 409 g. of triethylamine hydrochloride are thus obtained.

The filtrate and the ether solution obtained from the washing of the hydrochloride are combined and the solvent is removed by distillation under atmospheric pressure. Distillation under atmospheric pressure yields 312 g. of 3-trimethylsiloxy-prop-1-yne having the following properties:

boiling point (755 mm.): 111° C. $n_D^{20}$: 1.4090 $d_4^{20}$: 0.8336

EXAMPLE 2

A mixture of 350 ml. of ethanol (256 g.) and 50 g. of the *cis-trans* mixture of 1-triethoxysilyl-3-trimethylsiloxy-prop-1-ene, prepared in Example 1, is boiled for 3 hours while 210 g. of a mixture of ethanol and ethoxytrimethylsilane are slowly distilled off. The mixture is cooled and the remainder of the ethanol then driven off under a pressure of 1 mm of mercury at about 20° C. until constant weight is reached.

36.5 g. of 1-triethoxysilyl-prop-1-en-3-ol (a mixture of *cis-trans* isomers in the proportion of 75/25) having the following properties:

$n_D^{20} = 1.438$ $d_4^{20} = 1.023$ are thus obtained.

Example EXAMPLE 3

250 g. of β-methoxyethyl alcohol and 50 g. of the *cis-trans* mixture of 1-triethoxysilyl-3-trimethylsiloxy-prop-1-ene, obtained in Example 1, are boiled for 18 hours, while slowly distilling 200 g. of a mixture of ethanol, (βmethoxyethoxy)trimethylsilane and β-methoxyethyl alcohol are slowly distilled off. After cooling the mixture to about 20° C., the remaining β-methoxyethyl alcohol is removed under a pressure of 1 mm. of mercury until constant weight is reached.

55.6 g. of 1-tri(B-methoxyethoxy)silyl-prop-1-en-3-ol are thus obtained.

EXAMPLE 4

A laminate based on woven glass fabric coated with 1-triethoxysilyl-3-trimethylsiloxy-prop-1-ene is prepared as follows:

Specimens (150×150 mm) of a glass fiber fabric of the satin type, weighting 308 g./m.² and having undergone a thermal deoiling are immersed in a solution of 1-triethoxysilyl, 3-trimethylsiloxy-prop-1-ene (2,4 % by weight) in a mixture of water and ethanol (volume ratio 1.1). The fabric is dried at 130° for 7 minutes in a ventilated air oven. After cooling, 11 specimens are coated with a mixture prepared by, melting together 40,2 parts of p p' diamino-diphenylmethane and 150 parts of an epoxy resin marketed under the name "Araldite LY 556." The coated specimens are stacked to form a laminated assembly which is compressed under 30 kg./cm.² and heated under pressure at 130° C. for 30 minutes. The laminate thus obtained is then heated at 150° for 4 hours in a ventilated air oven. After cooling it has a glass content of 62,2 % by weight and a bending strength of 48 kg./mm². After immersion during 3 days in boiling water the bending strength is still 33 kg./mm²

We claim:

1. Organosilicon compounds of the formula:

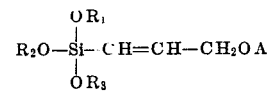

wherein $R_1$, $R_2$ and $R_3$ may be the same or different and each represents an unsubstituted or alkoxy-, cycloalkoxy-, aryloxy-, aralkoxy- or alkylaryloxy-substituted alkyl, cycloalkyl, aryl, aralkyl or alkylaryl radical and optionally two of the radicals $R_1$, $R_2$ and $R_3$ are joined to form a single divalent radical which with the Si atom forms a dioxasilane ring; and A represents a hydrogen atom or a radical of the formula:

wherein $R_4$, $R_5$ and $R_6$ may be the same or different and each represents an alkyl, aryl or aralkyl radical.

2. Organosilicon compounds according to claim 1 wherein the alkyl radicals or the alkyl portions of the radicals $R_{1-6}$ contain 1 to 6 carbon atoms, the aryl radicals or aryl portions of the radicals $R_{1-6}$ are phenyl groups and the cycloalkyl radicals or the cycloalkyl portions of the radicals $R_{1-3}$ contain 5 or 6 carbon atoms.

3. A compound according to claim 1 which is 1-triethoxysilyl- 3-trimethylsiloxy-prop-1-ene.

4. A compound according to claim 1 which is 1-triethoxyprop-1-en-3-ol.

5. A compound according to claim 1 which is 1-triethoxyprop1-en-3-ol.

6. A process for preparing organosilicon compounds of the formula:

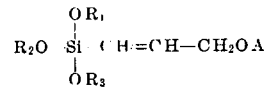

wherein $R_1$, $R_2$ and $R_3$ may be the same or different and each represents an unsubstituted or alkoxy-, cycloalkoxy-, aryloxy-, aralkoxy- or alkylaryloxy-substituted alkyl, cycloalkyl, aryl, aralkyl or alkylaryl radical and optionally two of the radicals $R_1$, $R_2$ and $R_3$ are joined to form a single divalent radical which with the Si atom form a dioxasilane ring and A represents a radical of the formula:

wherein $R_4$, $R_5$ and $R_6$ may be the same or different and each represents an alkyl, aryl or aralkyl radical: which process comprises reacting a hydrosilane of the formula:

$$R_2O-\underset{\underset{OR_3}{|}}{\overset{\overset{OR_1}{|}}{Si}}-H$$

wherein $R_1$, $R_2$ and $R_3$ are as hereinbefore defined with a 3-triorgano-siloxy-prop-1-yne of the formula:

$$HC{\equiv}C-CH_2O\underset{\underset{R_6}{|}}{\overset{\overset{R_4}{|}}{Si}}-R_5$$

wherein $R_4$, $R_5$ and $R_6$ are as hereinbefore defined.

7. A process according to claim 6 wherein the reaction is catalysed by ultraviolet radiation or by a compound based on nickel or platinum.

8. A process according to claim 7 wherein the catalyst is 0.01 to 0.1 g. per mol. of compound $$R_2O-\underset{\underset{OR_3}{|}}{\overset{\overset{OR_1}{|}}{Si}}-H,$$

of chloroplatinic acid.

9. A process for preparing organosilicon compounds of the formula:

$$R_2O-\underset{\underset{OR_3}{|}}{\overset{\overset{OR_1}{|}}{Si}}-CH=CH-CH_2OH$$

wherein $R_1$, $R_2$ and $R_3$ may be the same or different and each represents an unsubstituted or alkoxy-, cycloalkoxy-, aryloxy-, aralkoxy- or alkylaryloxy-substituted alkyl, cycloalkyl, aryl, aralkyl or alkylaryl radical and optionally two of the radicals $R_1$, $R_2$ and $R_3$ are joined to form a dioxasilane ring, which process comprises reacting an organosilicon compound of the formula:

$$R_2O-\underset{\underset{OR_3}{|}}{\overset{\overset{OR_1}{|}}{Si}}-CH=CH-CH_2O-\underset{\underset{R_6}{|}}{\overset{\overset{R_4}{|}}{Si}}-R_5$$

wherein $R_1$, $R_2$ and $R_3$ are as hereinbefore defined and $R_4$, $R_5$ and $R_6$ may be the same or different and each represents an alkyl, aryl or aralkyl radical, with an alcohol of the formula:

$$R_7OH$$

wherein $R_7$ represents an unsubstituted or alkoxy-, cycloalkoxy-, aryloxy- or alkylaryloxy-substituted alkyl, cycloalkyl, aryl, aralkyl or alkylaryl radical.

10. A process according to claim 9 wherein $R_7$ represents an alkyl or alkoxy alkyl radical.